(12) United States Patent
Wang et al.

(10) Patent No.: US 10,739,663 B2
(45) Date of Patent: Aug. 11, 2020

(54) LIGHT-EXITING DIRECTION ADJUSTMENT ELEMENT AND CONTROL METHOD THEREOF, AND DISPLAY DEVICE

(71) Applicant: BOE TECHNOLOGY GROUP CO., LTD., Beijing (CN)

(72) Inventors: Yingtao Wang, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 111 days.

(21) Appl. No.: 15/939,409

(22) Filed: Mar. 29, 2018

(65) Prior Publication Data

US 2019/0094576 A1    Mar. 28, 2019

(30) Foreign Application Priority Data

Sep. 22, 2017 (CN) .......................... 2017 1 0868866

(51) Int. Cl.
| | |
|---|---|
| *G02F 1/1335* | (2006.01) |
| *G02F 1/167* | (2019.01) |
| *G02F 1/13* | (2006.01) |
| *G02F 1/1677* | (2019.01) |
| *G02F 1/1676* | (2019.01) |
| *G02F 1/16756* | (2019.01) |
| *G02F 1/13357* | (2006.01) |

(52) U.S. Cl.
CPC ............ *G02F 1/167* (2013.01); *G02F 1/1323* (2013.01); *G02F 1/1676* (2019.01); *G02F 1/1677* (2019.01); *G02F 1/16756* (2019.01); *G02B 2207/123* (2013.01); *G02F 1/133512* (2013.01); *G02F 2001/133607* (2013.01); *G02F 2201/122* (2013.01); *G02F 2201/44* (2013.01)

(58) Field of Classification Search
CPC ....... G02F 1/1323; G02F 2001/133607; G02F 2201/44; G02F 2201/122; G02B 26/08; G02B 2207/123
See application file for complete search history.

(56) References Cited

U.S. PATENT DOCUMENTS

| | | | | |
|---|---|---|---|---|
| 2016/0077363 | A1* | 3/2016 | Shiota | G02F 1/133602 349/61 |
| 2016/0370642 | A1* | 12/2016 | Yoon | G02F 1/13439 |
| 2017/0082904 | A1* | 3/2017 | Miyata | G02F 1/167 |

FOREIGN PATENT DOCUMENTS

| | | |
|---|---|---|
| CN | 104808384 A | 7/2015 |
| CN | 106462025 A | 2/2017 |

OTHER PUBLICATIONS

First Office Action for Chinese Patent Application No. 201710868866.8 dated Aug. 5, 2019.

* cited by examiner

*Primary Examiner* — Paisley L Wilson
(74) *Attorney, Agent, or Firm* — Calfee, Halter & Griswold LLP

(57) ABSTRACT

The present disclosure relates to a light-exiting direction adjustment element including a first substrate; a second substrate disposed opposite to the first substrate; a light transmission part disposed between the first substrate and the second substrate; and an adjustment part disposed between the adjacent light transmission parts, wherein the adjustment part includes an electrode control unit and light-shielding charged particles used to shield light passing through the adjustment part under control of the electrode control unit.

9 Claims, 6 Drawing Sheets

Input a first control signal to the electrode control unit such that the light-shielding charged particles are getting close to the second substrate — S1

Fig. 13

Input a first control signal to the electrode control unit such that the light-shielding charged particles are getting close to the second substrate — S1

Stop the inputting of the control signal to the electrode control unit — S2

Fig. 14

Input a first control signal to the electrode control unit such that the light-shielding charged particles are getting close to the second substrate — S1

Input a second control signal to the electrode control unit such that the light-shielding charged particles are getting close to the first substrate — S3

Fig. 15

LIGHT-EXITING DIRECTION ADJUSTMENT ELEMENT AND CONTROL METHOD THEREOF, AND DISPLAY DEVICE

CROSS-REFERENCE TO RELATED APPLICATIONS

This application claims priority to Chinese Patent Application No. 201710868866.8, filed Sep. 22, 2017, the entire contents of which are incorporated as a portion of the present application herein by reference.

TECHNICAL FIELD

The present disclosure generally relates to field of display technology, and more particularly, to a light-exiting direction adjustment element, a display device, and a control method for the light-exiting direction adjustment element.

BACKGROUND

Conventional anti-peep display devices are mainly implemented by narrowing a display view-angle.

SUMMARY

According to a first aspect of embodiments of the present disclosure, there is provided a light-exiting direction adjustment element, including:

a first substrate;

a second substrate disposed opposite to the first substrate;

a light transmission part disposed between the first substrate and the second substrate; and an adjustment part disposed between the adjacent light transmission parts, wherein the adjustment part includes an electrode control unit and light-shielding charged particles used to shield light passing through the adjustment part under control of the electrode control unit.

According to a second aspect of the embodiments of the present disclosure, there is provided a display device, including a display module; and a light-exiting direction adjustment element according to any one of the above-described embodiments.

According to a third aspect of the embodiments of the present disclosure, there is provided a method for controlling a light-exiting direction adjustment element, for controlling the light-exiting direction adjustment element according to any one of the above-described embodiments, wherein the method includes:

inputting a first control signal to the electrode control unit such that the light-shielding charged particles are getting close to the second substrate.

It is to be understood that both the foregoing general description and the following detailed description are exemplary and explanatory only and are not restrictive of the present invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 13 is a flow chart showing a control method for a light-exiting direction adjustment element according to an embodiment of the present disclosure.

FIG. 14 is a flow chart showing another control method for a light-exiting direction adjustment element according to an embodiment of the present disclosure.

FIG. 15 is a flow chart showing still another control method for a light-exiting direction adjustment element according to an embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Figure 1:
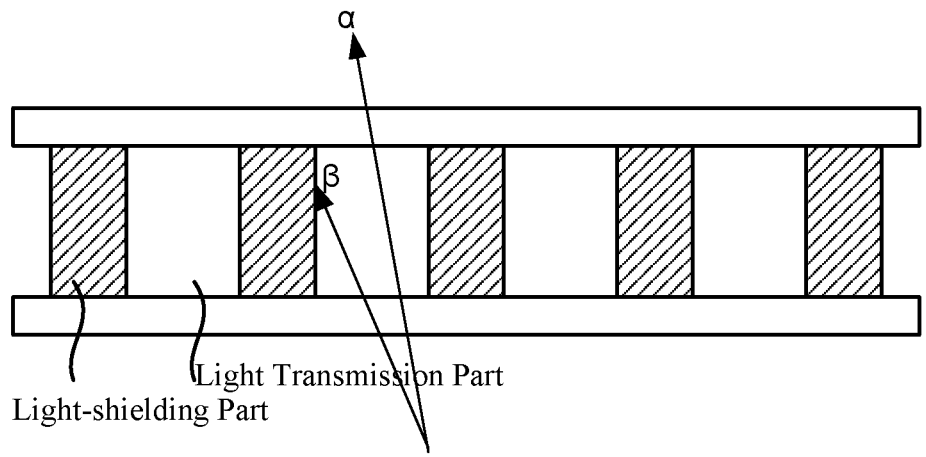
FIG. 1 is a schematic structure diagram illustrating a light-shielding film in the relevant art.

In the relevant art, in a liquid crystal display module, a light-shielding film is disposed between a display panel and a backlight module, wherein a light-shielding part and a light transmission part are alternatively disposed. Referring to FIG. 1, as for light emitting from the backlight module, only light (e.g. light α in FIG. 1) with a smaller exiting angle can be emitted from the light-shielding film, and light (e.g. light β in FIG. 1) with a larger exiting angle will be irradiated onto the light-shielding part and will be absorbed, thus cannot be exited from the light-shielding film. In this way, only light with a smaller exiting angle can be emitted out of the display panel, thus narrowing a display view-angle of the display device.

However, for current display devices, in order to perform switching between a small view-angle and a large view-angle, a scattering layer is required to be disposed between the light-shielding layer and the display panel, which increases a whole thickness of the display device.

Figure 2:
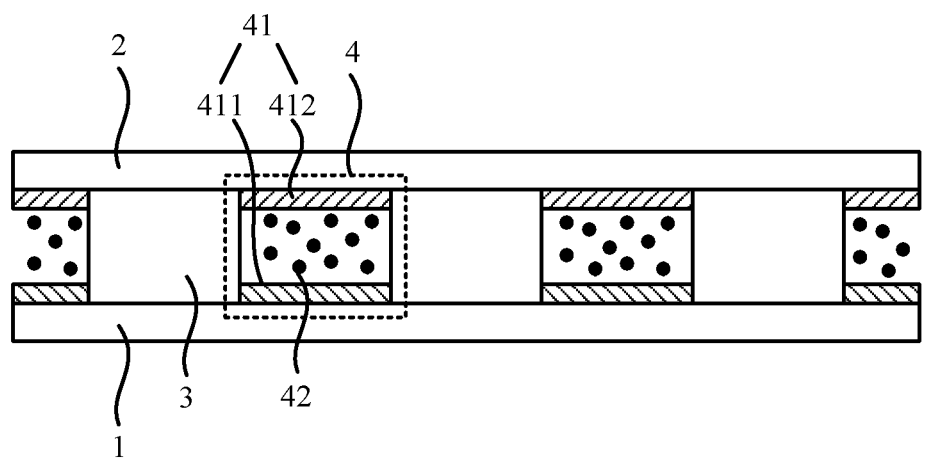
FIG. 2 is a schematic structure diagram illustrating a light-exiting direction adjustment element according to an embodiment of the present disclosure.

FIG. 2 is a schematic structure diagram illustrating a light-exiting direction adjustment element according to an embodiment of the present disclosure. The light-exiting direction adjustment element in the present embodiment may be applied to a variety of display modules, such as liquid crystal display modules, organic light emitting diode display modules. As shown in FIG. 2, the light-exiting direction adjustment element includes:

a first substrate 1; and a second substrate 2 disposed opposite to the first substrate 1.

In an embodiment, a material of the first substrate and the second substrate may be glass, or other transparent insulating materials.

The light-exiting direction adjustment element further includes a light transmission part 3 disposed between the first substrate 1 and the second substrate 2; and an adjustment part 4 disposed between adjacent light transmission parts 3, wherein the adjustment part 4 includes an electrode control unit 41 and light-shielding charged particles 42 used to shield light passing through the adjustment part under control of the electrode control unit 41.

In an embodiment, a material for the light transmission part may be glass, a transparent resin, or other transparent materials.

In an embodiment, the electrode control unit 41 may include:

a first electrode 411 disposed on a side of the first substrate 1 closer to the second substrate 2; and a second electrode 412 disposed on a side of the second substrate 2 closer to the first substrate 1, wherein the light-shielding charged particles 42 may be provided between the first electrode 411 and the second electrode 412.

In an embodiment, a material for the first electrode and/or the second electrode may be a transparent conductive material, such as indium tin oxide (ITO), or may be a non-transparent material. Wherein voltage inputted to the first electrode and voltage inputted to the second electrode may have opposite polarities, for example, a positive voltage is inputted to the first electrode, and a negative voltage is inputted to the second electrode, or a negative voltage is inputted to the first electrode, and a positive voltage is inputted to the second electrode.

It shall be noted that the first electrode and the second electrode may be disposed between the adjacent light transmission parts, as shown in FIG. 2. Alternatively, the structures of the first electrode and the second electrode may be adjusted as required, for example, the first electrode and the second electrode may be configured in a planar shape individually, and the light transmission part is disposed between the first electrode and the second electrode.

In an embodiment, the light-shielding charged particles may be metal charged particles, or may be charged particles of other materials, such as an organic material. The light-shielding charged particles may contain positive charges, or negative charge, which may be specified according to the needs. Hereinafter, illustrative descriptions of the embodiments of the present disclosure will be provided by taking an example of the light-shielding charged particles containing positive charges.

Figure 3:
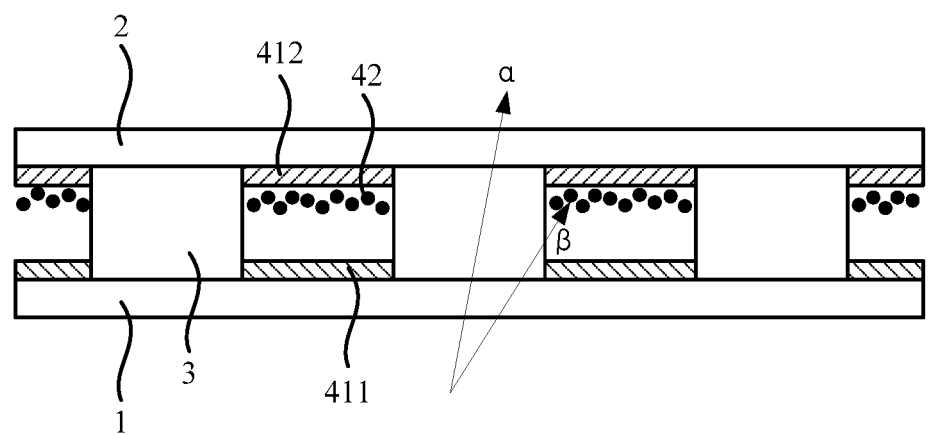
FIG. 3 is a diagram illustrating a state of the light-shielding charged particles according to an embodiment of the present disclosure.
Figure 4:
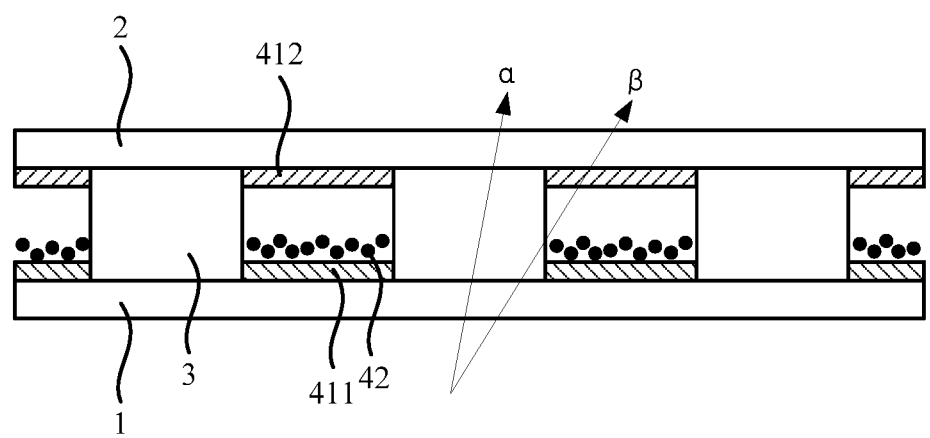
FIG. 4 is a diagram illustrating another state of the light-shielding charged particles according to an embodiment of the present disclosure.

FIG. 3 is a diagram illustrating a state of the light-shielding charged particles according to an embodiment of the present disclosure. FIG. 4 is a diagram illustrating another state of the light-shielding charged particles according to an embodiment of the present disclosure.

In an embodiment, because the light-shielding charged particles contain charges, the state of the light-shielding charged particles may be adjusted in the adjustment part by controlling voltage inputted to the first electrode and the second electrode. Hereinafter, illustrative descriptions of the embodiments of the present disclosure will be made by taking an example in which the light-shielding charged particles contain positive charges.

As illustrated in FIG. 3, a positive voltage may be inputted to the first electrode 411, and a negative voltage may be inputted to the second electrode 412, for example. Because the light-shielding charged particles 42 are positively charged, they will be repelled by the first electrode 411, and will be attracted by the second electrode 412, thus getting close to the second substrate 2.

In this case, as for light emitted from below the first electrode 411 into the light-exiting direction adjustment element, light (e.g. light α in FIG. 3) having a smaller incident angle (an angle between the direction of the light and a normal of the first substrate) will not be incident into the adjustment part 4, and may be directly passing through the light transmission part 3 and exited out of the light-exiting direction adjustment element. However, light (e.g. light β in FIG. 3) with a larger incident angle will be incident into the adjustment part 4, and irradiated onto and absorbed by the light-shielding charged particles 42, thus it cannot be emergent from the light-exiting direction adjustment element. Based on this, it can guarantee that light which is incident into the light-exiting direction adjustment element with a smaller angle can be emitted from the light-exiting direction adjustment element, and an emergent angle (an angle between the direction of the light and the normal of the second substrate) of the light emitted out of the light-exiting direction adjustment element is substantively the same as the angle in the incident direction, thus guarantying that only light having a smaller emergent angle can be emitted out of the light-exiting direction adjustment element, and light with a larger emergent-angle cannot be exited out of the light-exiting direction adjustment element. When such light-exiting direction adjustment element is applied to a display device, small view-angle display may be implemented so as to avoid peeping.

It shall be noted that as shown in FIG. 2, the electrode control unit may include both the first electrode and the second electrode, or may include only the first electrode or the second electrode. For example, the electrode control unit may include only the first electrode. A positive voltage may be inputted to the first electrode such that the light-shielding charged particles are getting close to the second electrode; and the inputting of voltage to the first electrode is stopped, such that the light-shielding charged particles repel one another and are uniformly distributed in the adjustment part because of the same polarity.

As shown in FIG. 4, a negative voltage may be inputted to the first electrode 411, and a positive voltage may be inputted to the second electrode 412, because the light-shielding charged particles 42 contain positive charges, they will be attracted by the first electrode 411, and will be repelled by the second electrode 412, thus approaching the first electrode 411.

In this case, as for light emitted from below the first electrode 411 into the light-exiting direction adjustment element, light (e.g. light α in FIG. 4) having a smaller incident angle will not be incident into the adjustment part 4, and may be directly passing through the light transmission part 3 and exited out of the light-exiting direction adjustment element. However, light (e.g. light β FIG. 4) with a larger incident angle will be incident into the adjustment part 4, but will not be irradiated onto the light-shielding charged particles 42 because the light-shielding charged particles 42 are closer to the first electrode 411, therefore, the light can be emitted from the adjustment part 4. Based on this, it can guarantee that both of the light which is incident into the light-exiting direction adjustment element with a smaller incident angle and the light which is incident into the light-exiting direction adjustment element with a larger incident angle can be emitted out of the light-exiting direction adjustment element, and an emergent angle of the light emitted out of the light-exiting direction adjustment element is substantively the same as the angle in the incident direction, thus guarantying that both of the light having a larger emergent angle and the light having a smaller emergent angle can be emitted out of the light-exiting direction adjustment element. When such light-exiting direction adjustment element is applied to a display device, larger view-angle display will be realized.

As compared to the case where a light-shielding on the whole is used to shield light in the relevant art, in the embodiment shown in FIG. 4, only the light-shielding charged particles which are closer to the first substrate in the adjustment part are used to shield light such that light irradiated onto the adjustment part in a region nearer to the second electrode can be emitted out of the light-exiting direction adjustment element, thereby reducing absorption of light and increasing light transmission.

It is to be noted that in the embodiment shown in FIG. 4, only a negative voltage may be inputted to the first electrode 411 or only a positive voltage may be inputted to the second electrode 412, such that the light-shielding charged particles 42 are getting close to the first electrode 411.

According to the above-described embodiment, voltage inputted to the first electrode and to the second electrode are controlled in such a manner that the state of the light-shielding charged particles in the adjustment part may be adjusted, and thus the angle of the emergent light that can be shielded by the light-shielding charged particles may be adjusted, thereby realizing the adjusting of an emergent direction of the light. As compared to the relevant art, it is unnecessary to dispose a scattering layer, which is beneficial for both reducing production costs and decreasing structure thickness.

Figure 5:
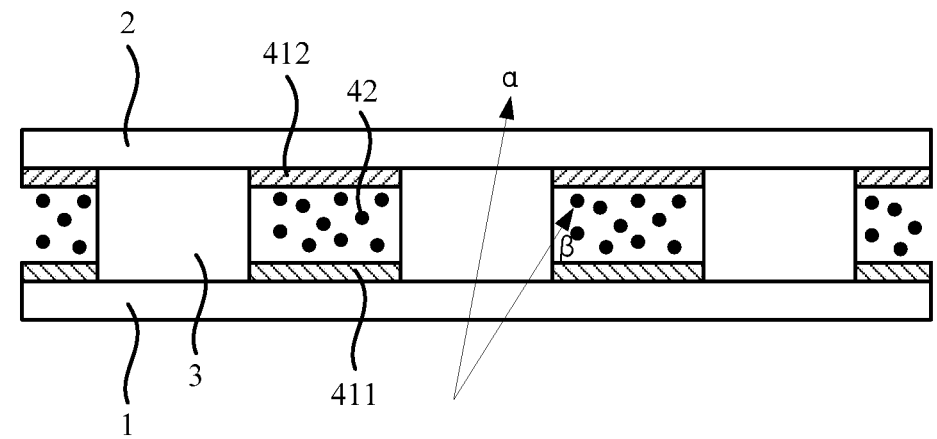
FIG. 5 is a diagram illustrating still another state of light-shielding charged particles according to an embodiment of the present disclosure.

FIG. 5 is a diagram illustrating still another state of light-shielding charged particles according to an embodiment of the present disclosure.

In an embodiment, as shown in FIG. 5, voltage may not be inputted to the first electrode or the second electrode such that the light-shielding charged particles will repel each other and will be uniformaly distributed in the adjustment part because they contain charges of the same polarity. In this situation, light (e.g. light β in FIG. 5) which is incident into the light-exiting direction adjustment element with a larger incident angle will be shielded by the light-shielding charged particles, but ligh (e.g. light α in FIG. 5) which is incident into the light-exiting direction adjustment element with a smaller incident angle may be emitted out of the light-exiting direction adjustment element by passing through the light transmission part, therefore small view-angle display will be realized.

Alternatively, as shown in FIG. 2, the electrode control unit 41 includes:

a first electrode 411 disposed on a side of the first substrate 1 closer to the second substrate 2; and a second electrode 412 disposed on a side of the second substrate 2 closer to the first substrate 1;

wherein the light-shielding charged particles 42 are provided between the first electrode 411 and the second electrode 412.

Alternatively, the light-exiting direction adjustment element further includes:

a first insulating layer disposed on a side of the first electrode closer to the second electrode; and a second insulating layer disposed on a side of the second electrode closer to the first electrode.

In an embodiment, the first insulating layer is disposed on a side of the first electrode closer to the second electrode and the second insulating layer is disposed on a side of the second electrode closer to the first electrode, such that the light-shielding charged particles can be prevented from directly contacting the first electrode or the second electrode, such that the charges carried in the light-shielding charged particles will be prevented from being neutralized.

Figure 6:
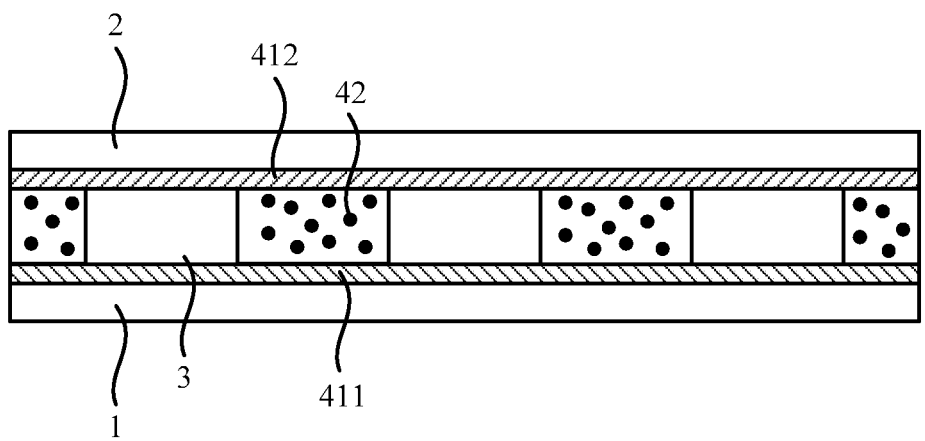
FIG. 6 is a schematic structure diagram illustrating another light-exiting direction adjustment element according to an embodiment of the present disclosure.

FIG. 6 is a schematic structure diagram illustrating another light-exiting direction adjustment element according to an embodiment of the present disclosure. As shown in FIG. 6, the first electrode 411 and/or the second electrode 412 extends to a region where the light transmission part 3 is located.

In an embodiment, the first electrode and the second electrode may be provided in a planar shape, for example, before the light transmission part is disposed, the first electrode may be disposed on a side of the first substrate closer to the second substrate, and the second electrode may be disposed on a side of the second substrate closer to the first substrate. As compared to the embodiment illustrated in FIG. 2, because the first electrode in a planar shape and/or the second electrode in a planar shape extend to the region where the light transmission part is located, that is, the first electrode and the second electrode are not required to be disposed between the light transmission parts, and no patterning process is required for the first electrode or the second electrode to make their shapes the same as that of the region between the light transmission parts, this beneficially simplifies the production processes. Moreover, it is only required to input a control signal to one first electrode and one second electrode to realize control of the light-shielding charged particles, in this way, wiring will be beneficially simplified.

Alternatively, the first electrode and/or the second electrode are disposed between the light transmission parts.

In an embodiment, for example, as shown in FIG. 2, the first electrode and the second electrode may be both disposed between the light transmission parts. As desirable, only the first electrode is disposed between the light transmission parts, or only the second electrode is disposed between the light transmission parts. Based on this, as compared to the embodiment shown in FIG. 6, a voltage inputted to the first electrode and/or the second electrode corresponding to each adjustment part may be adjusted, respectively, this is beneficial for improving accuracy of control of the light-shielding charged particles between the light transmission parts.

Figure 7:
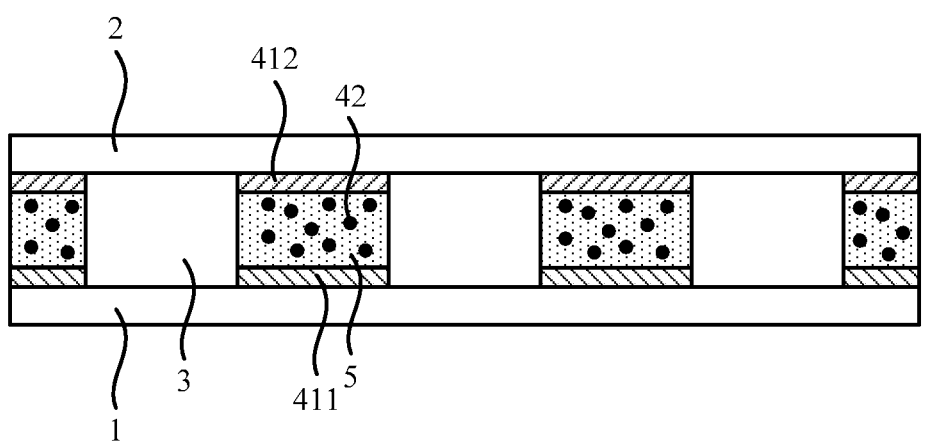
FIG. 7 is a schematic structure diagram illustrating still another light-exiting direction adjustment element according to an embodiment of the present disclosure.

FIG. 7 is a schematic structure diagram illustrating still another light-exiting direction adjustment element according to an embodiment of the present disclosure. As shown in FIG. 7, an insulating medium 5 is filled in the adjustment part 4, wherein the light-shielding charged particles 42 are provided in the insulating medium 5.

In an embodiment, the light-shielding charged particles may be provided in the insulating medium, and then the insulating medium provided with the light-shielding charged particles is disposed between the light transmission parts, as compared to the case where the light-shielding charged particles are directly disposed between the light transmission parts, this process is easier. Moreover, by filling the meidum in the region between the light transmission parts, the region between the light transmision parts will have a certain bearing capacity in a direction perpendicular to the first substrate, in this way, structure strength of the whole light-exiting direction adjustment element will be beneficially improved.

Alternatively, a material of the insulating medium includes at least one of nitrogen, carbon dioxide, oxygen, hydrogen, argon, helium, neon, and xenon.

In an embodiment, in addition to gaseous medium, the insulating medium may be a liquid medium, such as kerosene, chloroform, the deatiles may be specified according to the needs.

Alternatively, a material of the light-shielding charged particles includes at least one of an organic material, an inorganic material, and a mixture of organic and inorganic materials.

In an embodiment, clearink may be formed by the insulating medium and the light-shielding charged particles. The clearink may be poured into the region between the light transmission parts through inkjet, and the light transmission part may be specifically formed through nanoimprint.

Alternatively, a material of the light transmission part includes an organic resin.

Figure 8:
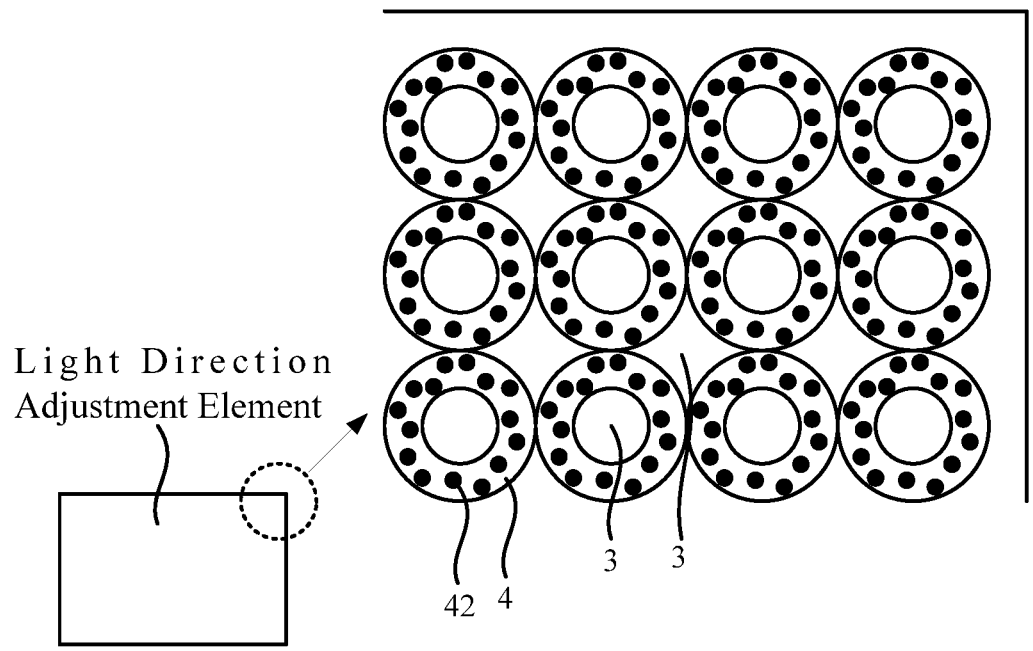
FIG. 8 is a diagram illustrating a cross section of a light-exiting direction adjustment element according to an embodiment of the present disclosure.
Figure 9:
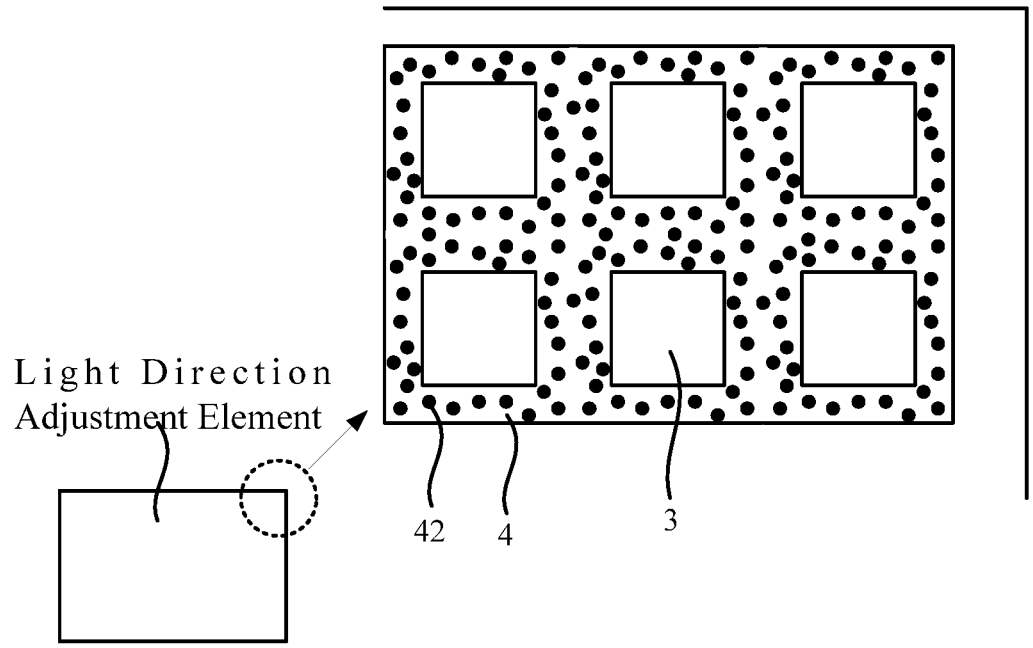
FIG. 9 is a diagram illustrating another cross section of a light-exiting direction adjustment element according to an embodiment of the present disclosure.

FIG. 8 is a diagram illustrating a cross section of a light-exiting direction adjustment element according to an embodiment of the present disclosure. FIG. 9 is a diagram illustrating another cross section of a light-exiting direction adjustment element according to an embodiment of the present disclosure.

As shown in FIG. 8, a cross section of the adjustment part 4 parallel to the first substrate is in a ring shape, or as shown in FIG. 9, a cross section of the light transmission part 3 parallel to the first substrate is in a rectangular shape.

In an embodiment, a shape of the cross section of the light transmission part may be configured according to the needs, further, a shape of the cross section of the adjustment part between the light transmission parts will be adjusted, for example, the shapes may be configured according to the embodiments shown in FIGS. 8 and 9 the shapes are relatively simple and are beneficial for simplifying the processes. It shall be noted that the shape of the cross section of the light transmission part and the shape of the cross section of the adjustment part are not limited to the embodiments shown in FIGS. 8 and 9 and the shape of the cross section of respective adjustment parts may be different, and the shape of the cross section of individual light transmission parts may also be different.

In an embodiment, a material of the light transmission part may be an organic resin, thus the adjustment part may be defined while the light transmission part in the shape of block is formed of the organic resin.

In an embodiment, an outline of the light transmission part may be formed by an organic resin, such as a transparent gas (e.g. air, nitrogen, helium or the like), and then a transparent material is filled in the formed outline, to form the light transmission part, and the adjustment part is defined while the outline of the light transmission part is formed.

An embodiment of the present disclosure further proposes a display device including a display module, and the light-exiting direction adjustment element according to any one of the above-described embodiments. It shall be noted that the display device in the present embodiment may be any product or component having a display function such as an electronic paper, a mobile phone, a tablet computer, a television, a notebook computer, a digital camera, and a navigator.

Figure 10:
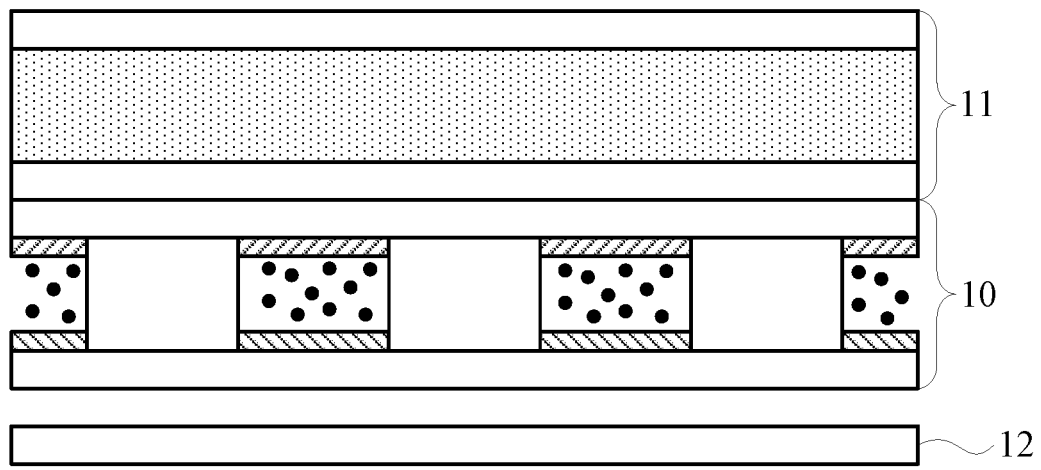
FIG. 10 is a structure diagram illustrating a display device according to an embodiment of the present disclosure.

FIG. 10 is a structure diagram illustrating a display device according to an embodiment of the present disclosure. As shown in FIG. 10, the display module includes a liquid crystal display panel 11 and a backlight module 12;

Wherein the light-exiting direction adjustment element 10 is disposed between the liquid crystal display panel 11 and the backlight module 12.

In an embodiment, the liquid crystal display panel may be TN, VA, IPS, FFS or other types. For example, the liquid crystal display panel may include an array substrate, a liquid crystal layer, a color film substrate or other structures. The backlight module may include a light source, a light guide plate, or other structures, which will not be repeated herein.

Figure 11:
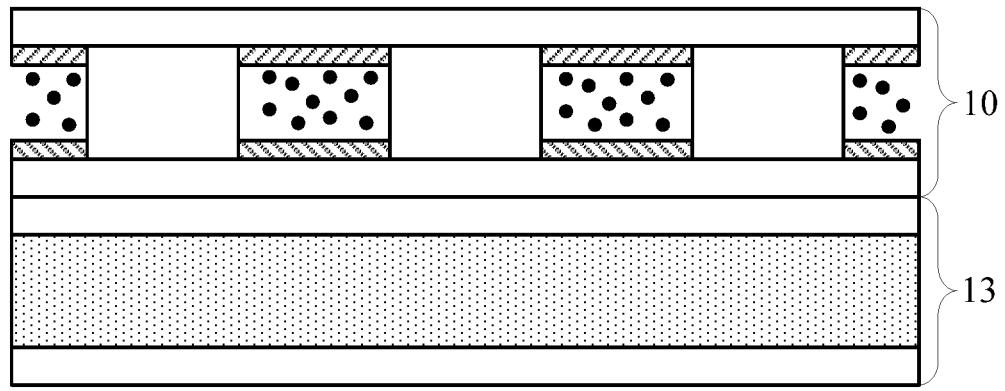
FIG. 11 is a structure diagram illustrating another display device according to an embodiment of the present disclosure.

FIG. 11 is a structure diagram illustrating another display device according to an embodiment of the present disclosure. As shown in FIG. 11, the display module includes an organic light emitting diode display panel 13.

Wherein the light-exiting direction adjustment element 10 is disposed on a side of the organic light emitting diode display panel 13 in a light-exiting direction.

In an embodiment, the organic light emitting diode may include a first electrode layer, a second electrode layer, and an organic light emitting layer disposed between the first electrode layer and the second electrode layer. The organic light emitting layer may specifically include a hole injection layer, a hole transport layer, a light emitting material layer, an electron transport layer, an electron injection layer, no repetitive description will be provided herein.

Figure 12:
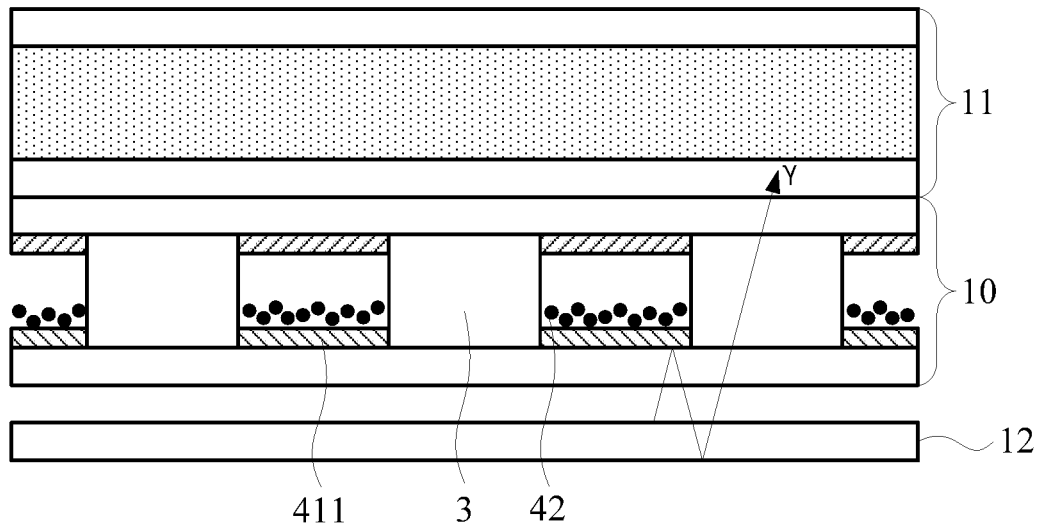
FIG. 12 is a diagram illustrating reflected light according to an embodiment of the present disclosure.

FIG. 12 is a diagram illustrating reflected light according to an embodiment of the present disclosure. As shown in FIG. 12, the electrode control unit includes:

a first electrode disposed on a side of the first substrate closer to the second substrate; and a second electrode disposed on a side of the second substrate closer to the first substrate.

Wherein the first electrode is closer to the backlight module or the organic light emitting diode display panel relative to the second electrode, and a material of the first electrode 411 is a reflecting material.

In an embodiment, a material of the first electrode may be a metal material, such as aluminum, silver. As shown in FIG. 11, the first electrode 411 is formed of the reflecting material, when light is incident into the light-exiting direction adjustment element and is irradiated onto the first electrode 411, light will not enter the adjustment part 4.

Illustrative descriptions will be made by taking an example in which the display panel is a liquid crystal display panel. When the light-shielding charged particles 42 are in the state in the embodiment shown in FIG. 4, that is, when large view-angle display is performed, light γ irradiated onto the first electrode 411 may be reflected by the first electrode 411 back to the backlight module 12. Because a reflecting layer is generally disposed at the bottom of a light guide plate of the backlight module 12, light γ may be reflected from the backlight module again and emitted out of the light-exiting direction adjustment element 10 by passing through the light transmission part 3, and then enter the liquid crystal display panel 11, thereby improving light transmission of the light-exiting direction adjustment element. As for the organic light emitting diode display panel, the first electrode may perform similar function.

FIG. 13 is a flow chart showing a control method for a light-exiting direction adjustment element according to an embodiment of the present disclosure. The method is used for controlling the light-exiting direction adjustment element according to any one of the above-described embodiments. As shown in FIG. 13, the control method includes the following steps.

In step S1, a first control signal is inputted to the electrode control unit such that the light-shielding charged particles are approaching the second substrate.

In an embodiment, for example, when the electrode control unit includes a first electrode disposed on a side of the first substrate closer to the second substrate, and a second electrode disposed on a side of the second substrate closer to the first electrode, the first control signal includes a first voltage inputted to the first electrode and a second voltage inputted to the second electrode, wherein the first voltage may be a positive voltage, and the second voltage may be a negative voltage. A positive voltage is inputted to the first electrode, and a negative voltage is inputted to the second electrode, and in the case where the light-shielding charged particles contain positive charges, the light-shielding charged particles will be repelled by the first electrode and will be attracted by the second electrode, thereby will be getting close to the second substrate.

In this case, the light-shielding charged particles are in the state in the embodiment shown in FIG. 3, the light-exiting direction adjustment element may be used to implement small view-angle display, to avoid peeping.

FIG. 14 is a flow chart showing another control method for a light-exiting direction adjustment element according to an embodiment of the present disclosure. As shown in FIG. 14, the control method includes the following step.

In step S2, the inputting of the control signal to the electrode control unit is stopped.

In an embodiment, the inputting of voltage to the electrode control unit is stopped, and the light-shielding charged particles will repel one another and will be uniformly distributed in the adjustment part because they carry charges of the same polarity. In this case, light which is incident into the light-exiting direction adjustment element with a larger angle can be shielded by the light-shielding charged particles, such that the light-exiting direction adjustment element realizes small view-angle display.

In an embodiment, in order to guarantee that the light-shielding charged particles are uniformly distributed in the adjustment part, after the control signal is inputted, an inverse control signal is inputted briefly. For example, in the case where the electrode control unit includes a first electrode on a side of the first substrate closer to the second substrate, and a second electrode disposed on a side of the second substrate closer to the first electrode, after a negative voltage is inputted to the first electrode and a positive voltage is inputted to the second electrode such that the light-shielding charged particles are in the state of the embodiment shown in FIG. 4, a positive voltage may be inputted to the first electrode, and a negative voltage may be inputted to the second electrode, briefly, such that the light-shielding charged particles will not get too close to the first substrate, and further, the light-shielding charged particles will repel each other and will be dispersed due to the contained charges.

FIG. 15 is a flow chart showing still another control method for a light-exiting direction adjustment element according to an embodiment of the present disclosure. As shown in FIG. 15, the control method further includes the following step.

In step S3, a second control signal is inputted to the electrode control unit such that the light-shielding charged particles are getting close to the first substrate.

In an embodiment, for example, when the electrode control unit includes a first electrode disposed on a side of the first substrate closer to the second substrate, and a second electrode disposed on a side of the second substrate closer to the first electrode, the second control signal includes a second voltage inputted to the first electrode and a first voltage inputted to the second electrode, wherein the first voltage may be a positive voltage, and the second voltage may be a negative voltage. A negative voltage is inputted to the first electrode, and a positive voltage is inputted to the second electrode, and in the case where the light-shielding charged particles contain positive charges, the light-shielding charged particles will be attracted by the first electrode and will be repelled by the second electrode, thereby will be getting close to the first substrate.

In this case, the light-shielding charged particles are in the state in the embodiment shown in FIG. 4, the light-exiting direction adjustment element may be used to implement larger view-angle display.

By the control method in the above-described embodiments, voltage inputted to the first electrode and to the second electrode are controlled in such a manner that the state of the light-shielding charged particles in the adjustment part may be adjusted, and thus the angle of the emergent light that can be shielded by the light-shielding charged particles may be adjusted, thereby realizing the adjusting of an emergent direction of the light. As compared to the relevant art, it is unnecessary to dispose a scattering layer, which is beneficial for both reducing production costs and decreasing structure thickness.

It shall be noted that size of the layers and regions in the drawings may be exaggerated for the purpose of clarity. It will be understood that, when an element or a layer is referred to as being "on" another element or layer, it can be "directly" on the other element, the other layer, or an intervening layer may also be present. In addition, it will be understood that, when an element or a layer is referred to as being "under" another element or layer, it can be "directly" under the another element or layer, or one or more intervening layers or elements may also be present. Furthermore, it will be understood that, when an element or a layer is referred to as being "between" two elements or two layers, it may be the only layer or element between the two layers or the two elements, or one or more intervening layers or elements may also be present. Similar reference signs denote similar elements through out the drawings.

Words "first" and "second" in this disclosure do not denote or imply relative importance, but are merely for the purposes of description.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A light-exiting direction adjustment element, comprising:
a first substrate;
a second substrate, disposed opposite to the first substrate;
at least two light transmission parts, disposed between the first substrate and the second substrate; and
an adjustment part, disposed between every adjacent two of the light transmission parts,
wherein the adjustment part comprises an electrode control unit and light-shielding charged particles configured to shield light passing through the adjustment part under control of the electrode control unit,
wherein the electrode control unit comprises:
a first electrode disposed on a side of the first substrate closer to the second substrate; and
a second electrode disposed on a side of the second substrate closer to the first substrate,
wherein the light-shielding charged particles are provided between the first electrode and the second electrode,
wherein the first electrode and the second electrode are disposed between the adjacent light transmission parts,
wherein a cross section of the adjustment part parallel to the first substrate is in a ring shape,
wherein an insulating medium is filled in the adjustment part, and wherein the light-shielding charged particles are provided in the insulating medium, and
wherein a material of the insulating medium comprises at least one of nitrogen, carbon dioxide, oxygen, hydrogen, argon, helium, neon, xenon, kerosene and chloroform.

2. The light-exiting direction adjustment element according to claim 1, further comprising:
a first insulating layer disposed on a side of the first electrode closer to the second electrode; and
a second insulating layer disposed on a side of the second electrode closer to the first electrode.

3. The light-exiting direction adjustment element according to claim 1, wherein a material of the light-shielding charged particles comprises at least one of an organic material, an inorganic material, and a mixture of organic and inorganic materials.

4. The light-exiting direction adjustment element according to claim 1, wherein a material of the light transmission parts comprises an organic resin.

5. A display device, comprising:
a display module; and
a light-exiting direction adjustment element, wherein the light-exiting direction adjustment element comprises:
a first substrate;
a second substrate, disposed opposite to the first substrate;
at least two light transmission parts, disposed between the first substrate and the second substrate; and
an adjustment part disposed between every adjacent two of the light transmission parts,
wherein the adjustment part comprises an electrode control unit and light-shielding charged particles configured to shield light passing through the adjustment part under control of the electrode control unit,
wherein the electrode control unit comprises:
a first electrode disposed on a side of the first substrate closer to the second substrate; and
a second electrode disposed on a side of the second substrate closer to the first substrate,
wherein the light-shielding charged particles are provided between the first electrode and the second electrode,
wherein the first electrode and the second electrode are disposed between the adjacent light transmission parts,
wherein a cross section of the adjustment part parallel to the first substrate is in a ring shape,
wherein an insulating medium is filled in the adjustment part, and wherein the light-shielding charged particles are provided in the insulating medium, and
wherein a material of the insulating medium comprises at least one of nitrogen, carbon dioxide, oxygen, hydrogen, argon, helium, neon, xenon, kerosene and chloroform.

6. The display device according to claim 5, wherein the display module comprises a liquid crystal display panel and a backlight module,
wherein the light-exiting direction adjustment element is disposed between the liquid crystal display panel and the backlight module.

7. The display device according to claim 6,
wherein the first electrode is closer to the backlight module relative to the second electrode, and a material of the first electrode is a reflecting material.

8. The display device according to claim 5, wherein the display module comprises an organic light emitting diode display panel,
wherein the light-exiting direction adjustment element is disposed on a side of the organic light emitting diode display panel in a light-exiting direction.

9. The display device according to claim 8, wherein
the first electrode is closer to the organic light emitting diode display panel relative to the second electrode, and a material of the first electrode is a reflecting material.

* * * * *